United States Patent [19]
Blaner et al.

[11] Patent Number: 5,659,722
[45] Date of Patent: Aug. 19, 1997

[54] MULTIPLE CONDITION CODE BRANCHING SYSTEM IN A MULTI-PROCESSOR ENVIRONMENT

[75] Inventors: Bartholomew Blaner, Underhill Center, Vt.; Larry D. Larsen, Raleigh, N.C.

[73] Assignee: International Business Machines Corporation, Armonk, N.Y.

[21] Appl. No.: 234,094

[22] Filed: Apr. 28, 1994

[51] Int. Cl.$^6$ ............................................. G06F 9/38
[52] U.S. Cl. ........................... 395/581; 395/580; 395/582
[58] Field of Search ................................ 395/375, 800, 395/580, 581, 582

[56] References Cited

U.S. PATENT DOCUMENTS

| | | | |
|---|---|---|---|
| 3,764,988 | 10/1973 | Onishi | 395/375 |
| 4,439,828 | 3/1984 | Martin | 395/375 |
| 4,742,451 | 5/1988 | Bruckert et al. | 395/375 |
| 4,766,566 | 8/1988 | Chuang | 395/375 |
| 4,827,402 | 5/1989 | Wada | 395/375 |
| 4,833,599 | 5/1989 | Colwell et al. | 395/650 |
| 4,853,840 | 8/1989 | Shibuya | 395/375 |
| 4,903,196 | 2/1990 | Pomerene et al. | 395/375 |
| 4,974,155 | 11/1990 | Dolong et al. | 395/375 |
| 5,051,940 | 9/1991 | Vassiliadis et al. | 364/736 |
| 5,075,844 | 12/1991 | Jardine et al. | 395/375 |
| 5,081,574 | 1/1992 | Larsen et al. | 395/375 |
| 5,093,908 | 3/1992 | Beacom et al. | 395/375 |
| 5,101,344 | 3/1992 | Bonet et al. | 395/375 |
| 5,142,634 | 8/1992 | Fite et al. | 395/375 |
| 5,185,868 | 2/1993 | Tran | 395/375 |
| 5,197,135 | 3/1993 | Eickemeyer et al. | 395/375 |
| 5,197,136 | 3/1993 | Kimura et al. | 395/375 |
| 5,214,763 | 5/1993 | Blaner et al. | 395/375 |
| 5,283,873 | 2/1994 | Steely, Jr. et al. | 395/375 |
| 5,347,639 | 9/1994 | Rechtschaffen et al. | 395/375 |
| 5,349,671 | 9/1994 | Maeda et al. | 395/800 |
| 5,418,917 | 5/1995 | Hiraoka et al. | 395/375 |
| 5,421,026 | 5/1995 | Sato | 395/800 |

FOREIGN PATENT DOCUMENTS 4096133  3/1992  Japan.

OTHER PUBLICATIONS

Microprocessors and Microsystems, vol. 14, No. 6, Jul. 1990—Aug. 1990, London, GB, pp. 357–366, XP00 151093 "RISC System/6000 Processor Architecture", Groves & Oehler.

Microprocessing and Microprogramming, vol. 36, No. 5, Oct. 1993, Amsterdam, NL, pp. 259–278, XP000397908 "ALU Design and Processor Branch Architecture", GB Steven & FL Steven.

Computer Architecture News, vol. 18, No. 4, Dec. 1990, New York, US, pp. 35–51, XP000201913, Yen–Jen Oyang et al.: "Effect of Employing Advanced Branching Mechanisms in Superscaler Processors".

IBM Technical Disclosure Bulletin, V. 25, No. 1, Jun. 1982, pp. 136–137 "New Condition Code and Branch Architecture for High Performance Processors".

ESA/390 Principles of Operation, IBM Publication No. SA22–7201–00 (1992).

Assembler Language Reference for AIX Version 0.3 for RISC System/6000, IBM Publication No. SC23–2197 (1992).

(List continued on next page.)

Primary Examiner—Krisna Lim
Attorney, Agent, or Firm—Steven B. Phillips; George E. Clark

[57] ABSTRACT

A data processing system includes a number of processing elements wherein each of the processing elements generates one or more condition signals, one or more memory elements associated with the processing elements for storing instructions and data associated with the processing elements, at least one register for storing a predicate associated with each of the processing elements and logic for comparing condition signals from each of the processing elements with a corresponding predicate to generate one or more branch test signals, and combination logic to provide a single take branch signal based on branch test signals and logic masks associated with each of the predicates.

10 Claims, 5 Drawing Sheets

OTHER PUBLICATIONS

Emma, et al., "Multiple Queued Condition Codes," *IBM Technical Disclosure Bulletin*, vol. 31, No. 2, Jul. 1988, pp. 294–296.

Colwell, et al., "A VLIW Architecture for a Trace Scheduling Compiler," *IEEE Transactions on Computers*, vol. 37, No. 8, Aug. 1988, pp. 967–979.

Ebcioglu and Kumar, "A Wide Instruction Word Architecture for Parallel Execution of Logic Programs Coded in BSL," *New Generation Computing*, vol. 7, (1990), pp. 219–242.

Acosta, R. D., et al., "An Instruction Issuing Approach to Enhancing Performance in Multiple Functional Unit Processors," *IEEE Transactions on Computers*, Fall, C-35 No. 9, Sep. 1986, pp. 815–828.

Anderson, V. W., et al., The IBM System/360 Model 911, "Machine Philosophy and Instruction Handling," *Computer Structures: Principles and Examples*, Siewiorek, et al., ed., McGraw–Hill, 1982, pp. 276–292.

Capozzi, A. J., et al., "Non–Sequential High–Performance Processing," *IBM Technical Disclosure Bulletin* vol. 27, No. 3, Oct. 1984, pp. 2842–2844.

Chan, S. et al., "Building Parallelism into the Instruction Pipeline," *High Performance Systems*, Dec. 1989, pp. 53–60.

Murakami, K. et al., "SIMP (Single Instruction Stream/Multiple Instruction Pipelining)"; A Novel High–Speed Single Processor Architecture, *Proceedings of the Sixteenth Annual Symposium on Computer Architecture*, 1989, pp. 78–85.

Smith, J. E., "Dynamic Instructions Scheduling and the Astronautics ZS–1," *IEEE Computer*, Jul. 1989, pp. 21–35.

Smith, M. D., et al., "Limits on Multiple Instruction Issue," ASPLOS III, 1989, pp. 290–302.

Tomasulo, R. M., "An Efficient Algorithm for Exploiting Multiple Arithmetic Units," *Computer Structures, Principles, and Examples* (Siewiorak, et al., ed.), McGraw–Hill, 1982, pp. 293–302.

Wulf, P. S., "The WM Computer Architecture," *Computer Architecture News*, vol. 16, No. 1, Mar. 1988, pp. 70–84.

Jouppi, N. P., et al., "Available Instruction–Level Parallelism for Superscaler Pipelined Machines," ASFLOS III, 1989, pp. 272–282.

Jouppi, N. P. "The Non–Uniform Distribution of Instruction–Level and Machine Parallelism and its Effect on Performance," *IEEE Transactions on Computers*, vol. 38, No. 12, Dec. 1989, pp. 1645–1658.

Ryan, D. E., "Intel's 80960: An Architecture Optimized for Embedded Control," *IEEE Microcomputers*, vol. 8, No. 3, Jun. 1988, pp. 63–76.

Eberhard, R. J., *IBM Technical Disclosure Bulletin*, vol. 33, No. 10A, Mar. 1991.

Berenbaum, A. D., "Introduction to the CRISP Instruction Set Architecture," *Proceedings of COMPCON*, Spring 1987, pp. 86–89.

Bandyopadhyay, S., et al., "Compiling for the CRISP Microprocessor," *Proceedings of COMPCON*, Spring 1987, pp. 96–100.

Hennessy, J., et al., "MIPS: A VSI Processor Architecture," *Proceedings of the CMU Conference on VLSI Systems and Computations*, 1981, pp. 337–346.

Patterson, E. A., "Reduced Instruction Set Computers," *Communications of the ACM*, vol. 28, No. 1, Jan. 1985, pp. 8–21.

Radin, G., "The 801 Mini–Computer," *IBM Journal of Research and Development*, vol. 27, No. 3, May 1983, pp. 237–246.

Ditzel, D. R., et al., "Branch Folding in the CRISP Microprocessor: Reducing Branch Delay to Zero," *Proceedings of COMPCON*, Spring 1987, pp. 2–9.

Hwu, W. W., et al., "Checkpoint Repair for High–Performance Out–of–Order Execution Machines," *IEEE Transactions on Computers*, vol. C36, No. 12, Dec. 1987, pp. 1496–1594.

Lee, J. K. F., et al., "Branch Prediction Strategies in Branch Target Buffer Design," *IEEE Computer*, vol. 17, No. 1, Jan. 1984, pp. 6–22.

Riseman, E. M., "The Inhibition of Potential Parallelism by Conditional Jumps," *IEEE Transactions on Computers*, Dec. 1972, pp. 1405–1411.

Smith, J. K. "A Study of Branch Prediction Strategies," *IEEE Proceedings of the Eighth Annual Symposium on Computer Architecture*, May 1981, pp. 135–148.

Archibold, James, et al., Cache Coherence Protocols: "Evaluation Using a Multiprocessor Simulation Model," *ACM Transactions on Computer Systems*, vol. 4, No. 4, Nov. 1986, pp. 273–398.

Baer, J. L., et al., "Multi–Level Cache Hierarchies: Organizations, Protocols, and Performance," *Journal of Parallel and Distributed Computing*, vol. 6, 1989, pp. 451–476.

Smith, A. J., "Cache Memories," *Computing Surveys*, vol. 14, No. 3, Sep. 1982, pp. 473–530.

Smith, J. K., et al., "A Study of Instruction Cache Organizations and Replacement Policies," *IEEE Proceedings of the Tenth Annual International Symposium on Computer Architecture*, Jun. 1983, pp. 132–137.

Vassiliadis, S., et al., "Condition Code Predictory for Fixed–Arithmetic Units," *International Journal of Electronics*, vol. 66, No. 6, 1989, pp. 887–890.

Tucker, S. G., "The IBM 3090 System: An Overview," *IBM Systems Journal*, vol. 25, No. 1, 1986, pp. 4–19.

IBM Publication No. SA22–7200–0, Principles of Operation, IBM Enterprise Systems Architecture/370, 1988.

Kogge, Peter M., *The Architecture of Pipelined Computers*, Hemisphere Publishing Corp., 1981.

MULTIPLE CONDITION CODE BRANCHING SYSTEM IN A MULTI-PROCESSOR ENVIRONMENT

BACKGROUND OF THE INVENTION

1. Field of the Invention

The present invention relates to data processing systems, and more particularly to data processing systems having plural processing elements running simultaneously, each having a capability of producing branch condition signals asynchronously.

2. Prior Art

High performance data processing systems typically include several processing elements which perform computations under program control. An example of a processing element is a fixed point arithmetic and logic unit ("ALU") which performs arithmetic and logical operations on integer data. Another example of a processing element is a floating point ALU which performs arithmetic and logical operations on floating point data. Each processing element customarily produces condition signals which indicate conditions relevant to results being produced by the processing element. The signals may be interrogated by a subsequent conditional branch instruction and a decision made to branch or not to branch. A field of data bits which specify how the condition signals produced by a processing element are to be interpreted is referred to as a predicate field. A predicate field is usually part of the branch instruction. That is, it is an immediate field contained in the instruction or it is implied by the operation code of the branch instruction. Some computer architectures, such as the IBM ESA/390 architecture, generally described in *ESA/390 Principles of Operation*, IBM Publication No. SA22-7201-00 (1992), require that the condition signals of all processing elements in an implementation be reduced to a single condition code which may then be interrogated by a branch on condition instruction. The data processing system is required to reduce the condition signals of all processing elements into a single condition code. This reduction is complicated in a high performance system by the presence of many processing elements, differing instruction processing latencies between the processing elements, and for superscaler or for very long instruction word ("VLIW") systems, managing multiple condition signals being produced concurrently.

Reduction of condition signals from multiple processing elements to a single condition code necessarily discards potentially useful information, namely, the condition signals from the processing elements other than the one which was allowed to set the condition code. The IBM RISC System/6000 Architecture, as described in *Assembler Language Reference for AIX Version 0.3 for RISC System/6000*, IBM Publication No. 8C23-2197 (1992), alleviates this problem somewhat by defining separate fixed point and floating point condition register fields. The fixed point condition register field is set exclusively by fixed point processing element condition signals. The floating point condition register field is set exclusively by floating point process element condition signals. However, in a system with, for example, multiple fixed point ALUs, only one fixed point ALU is permitted to set the fixed point ALU condition register field in a given processor cycle. The condition signals from the other fixed point ALUs are lost.

By contrast, VLIW architectures typically define multiple condition codes, condition register fields, or some analogous structure. "A Wide Instruction Word Architecture for Parallel Execution of Logic Programs Coded in BSL" by Ebcioglu and Kumar, published in *New Generation Computing*, Volume 7, pp. 219–242 (1990), refers to condition codes $CC0$ through $CCn-1$ in a VLIW processor having n processors. To branch on n condition codes, however, requires n branch instructions, which although they may be executed in parallel, expend considerable instruction memory space and instruction bandwidth. Further, because of the tree like structure of a VLIW instruction, evaluation of $CCj$ will preclude the evaluation of $CCk$ (j not equal to k) if a branch on $CCj$ redirects the instruction stream. It is, therefore, not possible to evaluate complex logical combinations of condition codes with a single branch instruction, for example "branch if (($CC0$ and $CC1$) or $CC2$).

An article by Colwell, et at., entitled "A VLIW Architecture for a Trace Scheduling Compiler" published in IEEE Transactions on Computers, Vol. 37, No. 8, August, 1988, pp. 967–979 defines a 7 bit "branch bank" each bit of which is equivalent to a single bit condition code. Compare instructions are the only instructions which may set branch bank bits and a given compare instruction must specify which bit in the branch bank is to be set. Up to 7 compare instructions executing in parallel can each set its own branch bank bit, provided that the instructions were coded accordingly. However, as with the Ebcioglu, et al. reference, to branch on n branch bank bits requires n branch instructions, which expends considerable instruction memory space and instruction bus bandwidth. Further, a multiway branch in the Colwell, et al., machine is in essence a prioritized decision tree. Thus, the evaluation of branch bank bit j will preclude the evaluation of branch bank bit k (j not equal to k) if a branch on branch bank bit j redirects the instruction stream. It is, therefore, not possible to evaluate complex combination of branch bank bits with a single branch instruction.

An article by Emma, et al. entitled "Multiple Queued Condition Codes" published in the *IBM Technical Disclosure Bulletin*, Vol. 31, No. 2, July, 1988 at pp. 294–296 describes a technique which provides a queue of condition codes ("CC") which may be set by CC-setting instructions (for example, compare instructions) in a first in, first out register ("FIFO"), and thus sequential manner. Instructions that test CCs (for example, branch instructions) may test any CC in the queue, but also in a sequential manner. The article indicates that VLIW processors can test the CCs in parallel, but no mechanism is described.

By contrast, the data processing system according to the present invention allows multiple CCs to be set in parallel (that is, there is no FIFO restriction), includes a mechanism for testing multiple CCs in parallel, and permits multiple CCs to be combined in boolean expressions to formulate single cycle complex tests, thereby reducing or eliminating the need for sequences of branch instructions, which would require multiple processor cycles.

U.S. Pat. No. 5,093,908 to Beacom, et al. describes a data processing system including a synchronization mechanism between a main processor and a tightly coupled co-processor. The main processor is allowed to run ahead of the co-processor in the instruction stream, that is execute instruction sequentially ahead of the instruction being executed by the co-processor. The synchronization mechanism assures that sequential program behavior is preserved and that interrupts are reported precisely. It appears that the synchronization mechanism forces sequential execution when instructions executing in both the main and the co-processor attempt to set the condition code. The synchronization mechanism detects all conditions which might be violated by the co-processor before it has finished performing an instruction and holds off the main processor from executing a subsequent instruction.

3

In contrast, the data processing system according to the present invention requires no synchronization since each processor produces its own condition code. The synchronization mechanism in the Beacom et al. patent forces sequential program execution, thereby decreasing processor throughput whenever synchronization is necessary. Further, the data processing system according to the present invention allows multiple condition codes to be combined into complex boolean expressions, a concept which is not suggested by the patent.

SUMMARY OF THE INVENTION

It is therefore, an object of the present invention to efficiently handle branching on conditions in a data processing system having plural processing elements executing concurrently.

Accordingly, a data processing system in accordance with the present invention includes a plurality of processees executing in one or more processing elements wherein each of the processing elements generates one or more condition signals, one or more memory elements associated with the processing elements for storing instructions and data associated with the processees, at least one register for storing a predicate associated with each of said processing elements and logic for comparing the condition signals from each of said processing elements with the corresponding predicate to generate one or more branch test signals.

The present invention provides a flexible means of branching on conditions produced by multiple processing elements executing concurrently. Each processing element produces a set of condition signals unique to that process. The signals are maintained on a per processing element basis without reduction or combination into a single condition code or condition register field. Multiple predicates, with one predicate for each processing element, are used as test specifications for the condition signals that are generated in each associated processing element. The individual binary test result signals, one for each processing element, are used in a single branch instruction to determine branch path. Also, multiple logic mask fields, there being one logic mask field for each processing element, are used to specify how the individual test signals are combined to form a single branch or don't branch signal. The test combination logic permits complex combinations of result test signals to be evaluated by a single branch instruction. The test signals may be logically combined by setting the logic mask fields appropriately.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

4

DETAILED DESCRIPTION OF A PREFERRED EMBODIMENT OF THE INVENTION

Figure 1:
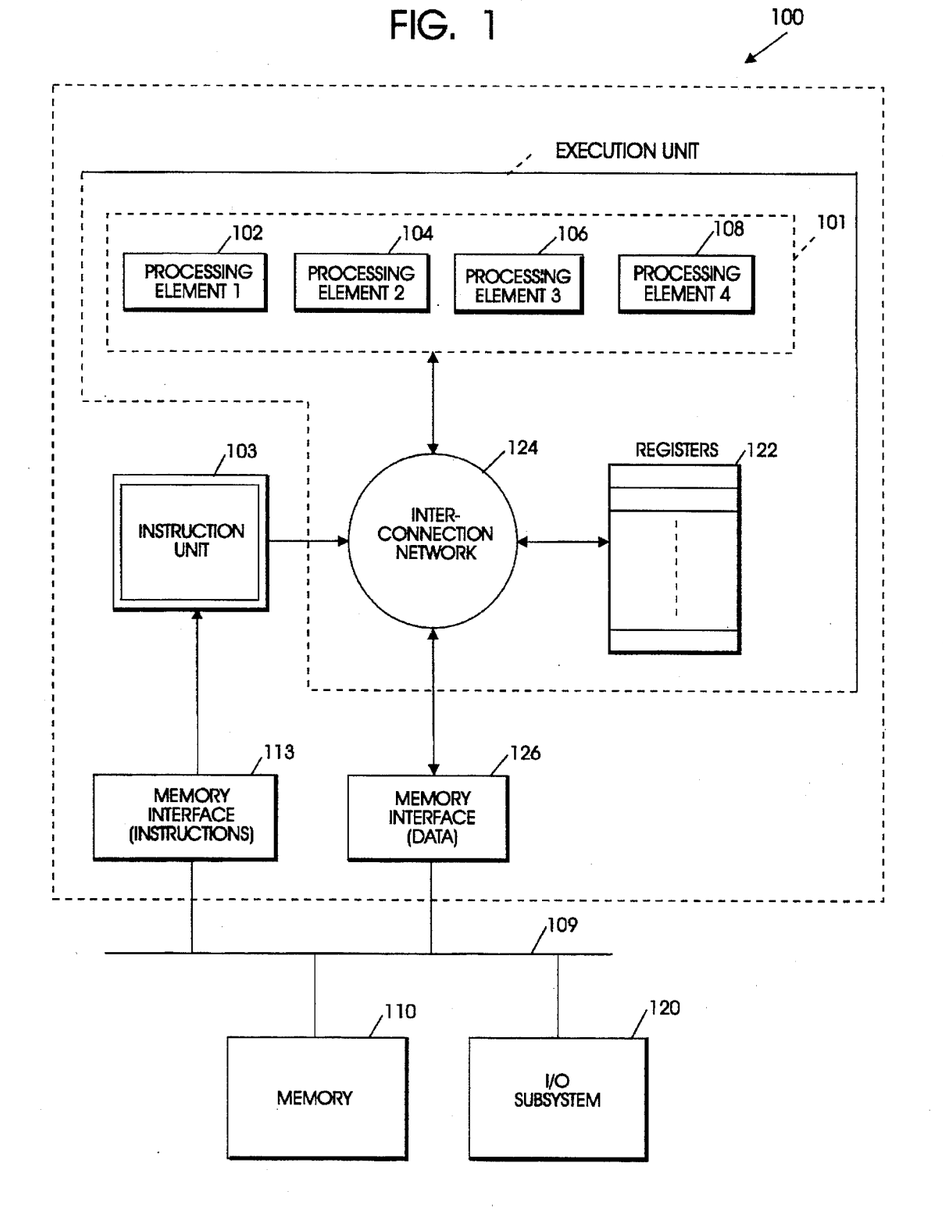
FIG. 1 is a block diagram of a data processing system embodying the present invention.

Referring now to FIG. 1, a data processing system embodying the present invention will be described. A central processor 100 includes an execution unit 101, an instruction unit 103, an instruction memory interface 113 and a data memory interface 126. The instruction unit 103 accesses instructions and prepares them for transfer to the execution unit 101 for execution in one or more processing elements (PE) 102, 104, 106 and 108. A PE accesses operands from and returns a result to a register file 122 included in execution unit 101. The following instruction format may be used:

OP S1, S2, D

Where destination register D receives the results of operation OP on the contents of source registers S1 and S2.

Figure 2:
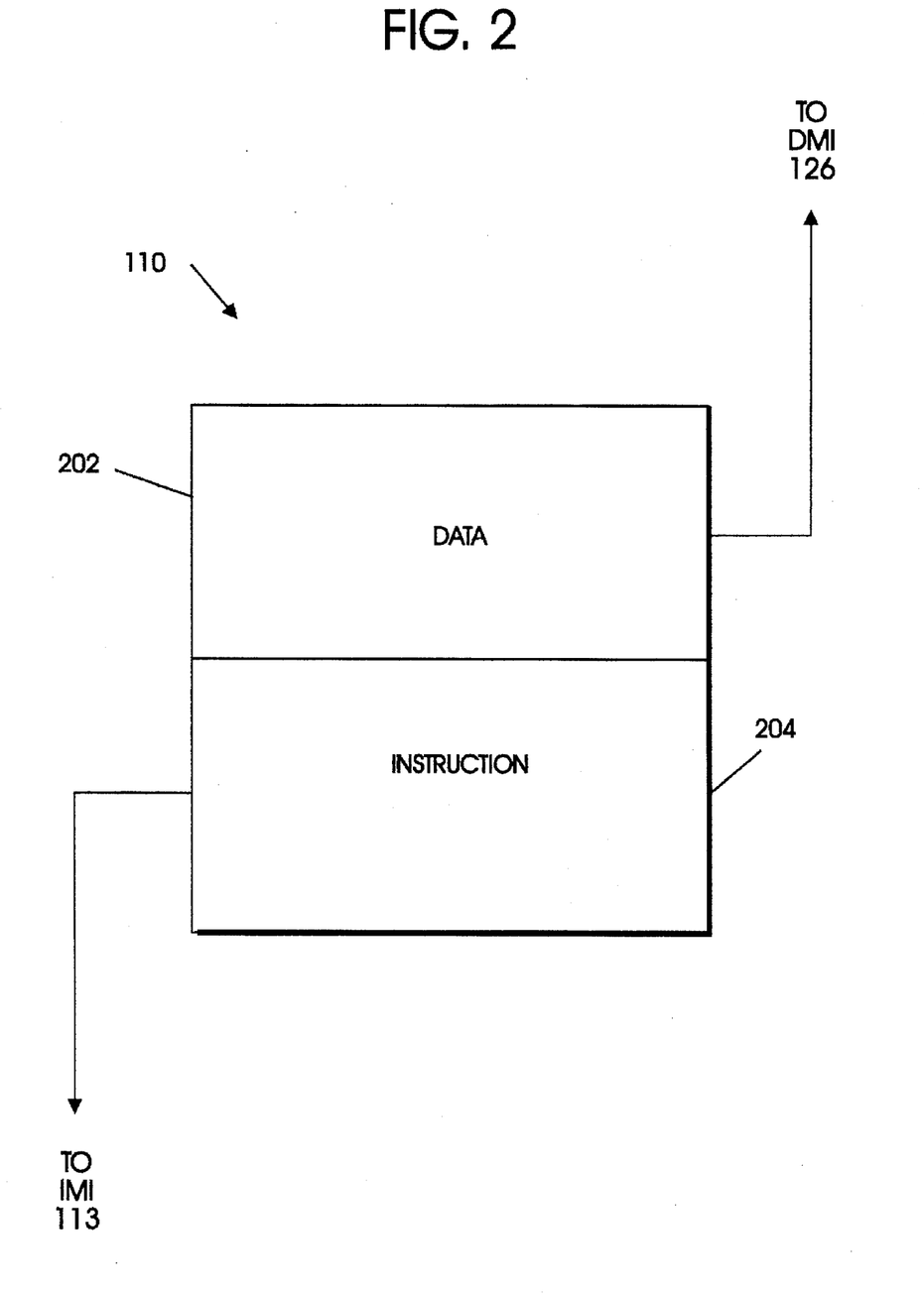
FIG. 2 is a block diagram of a memory block for storing instructions and data in accordance with the present invention.

Multiple PEs may be incorporated in execution unit 101 to increase the number of instructions executed per cycle. FIG. 1 illustrates a general purpose register (GPR) or load/store architecture. Instruction unit 103 fetches instructions from instruction storage 204 in memory 110 (see FIG. 2) which is connected to system bus 109 through instruction memory interface 113. The instructions are then passed by interconnection network 124 to the processing elements 102, 104, 106 and 108. Interconnection network 124 also passes data between processing elements 102, 104, 106 and 108 and registers 122 and through data memory interface 126 and system bus 109 to data storage 202 in memory 110 and to I/O subsystem 120.

Figure 3:
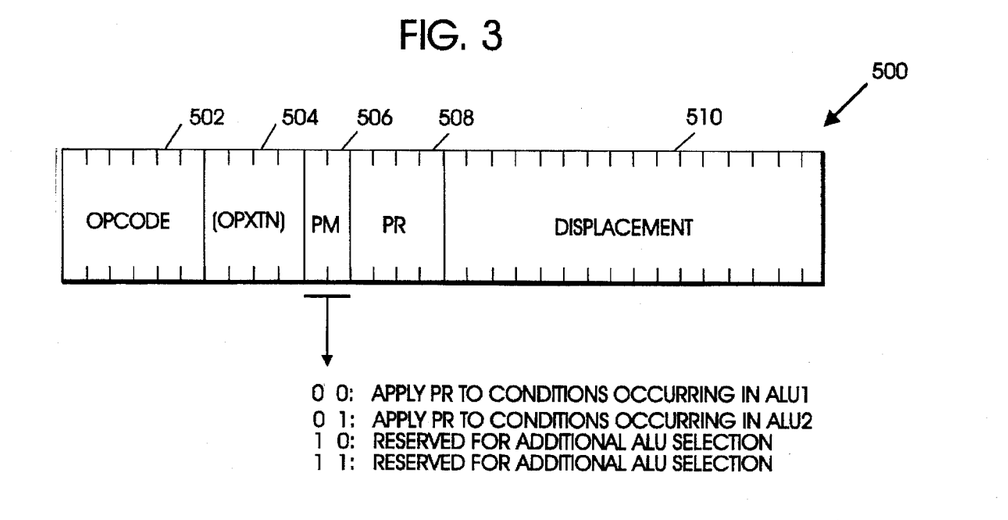
FIG. 3 is a diagram of an instruction format for an immediate predicate branch in accordance with an aspect of the present invention.
Figure 4:
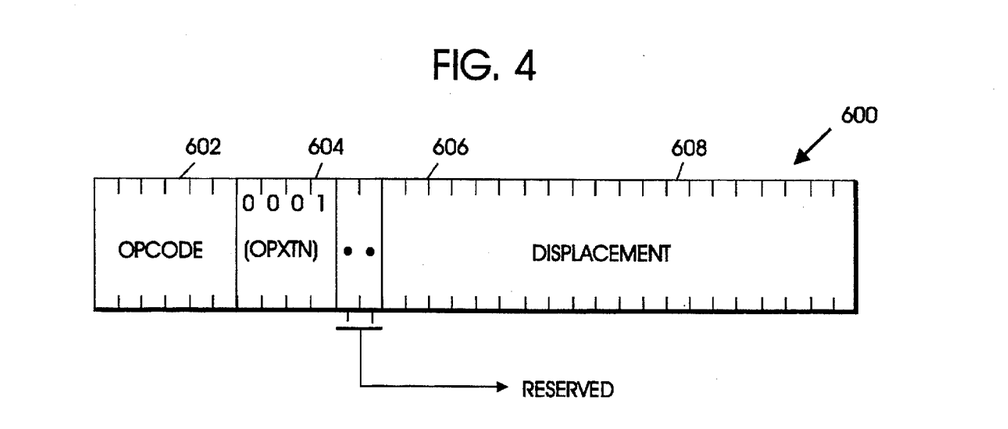
FIG. 4 is a diagram of an instruction format for a registered predicate branch in accordance with an aspect of the present invention.

In a data processing system embodying the present invention, two types of conditional branch instructions (see FIGS. 3 and 4) are provided to allow branching on the conditions produced by multiple processing elements. The first conditional branch instruction has a single immediate predicate field (see FIG. 3). The second conditional branch instruction (See FIG. 4) references one or more predicate values stored in a multiple predicate register (see FIG. 5). Each of these branch instruction types has its own format. The conditional branch instruction formats shown in FIGS. 3 and 4 are examples of instructions employing immediate (FIG. 3) and registered (FIG. 4) predicates.

The predicate field provides for testing of condition signals produced by a processing element. Table 1, which follows, provides example predicate definitions for testing condition signals output from a fixed-point PE. The PE outputs four condition signals defined as follows:

| | |
|---|---|
| C | carry out |
| S | result sign (if result < 0 then S = 1 else S = 0) |
| Z | result equals zero (if result = 0 then Z = 1 else Z = 0) |
| V | overflow |

By applying different predicate codes to these condition signals, various relational tests may be performed. For example, predicate code 0010 binary performs the test Z or S. If Z or S is true, then the relation R←0 is true, and the branch instruction applying this predicate would be taken. An unconditional predicate (code 1001 binary), which ignores the PE condition signals, provides for an unconditionally-taken branch.

Table 1 which follows provides examples of predicate definitions for fixed point operations.

TABLE 1

Predicate Definition for Fixed-point Operations

| Predicate Code | Predicate | Condition Signals Test |
|---|---|---|
| 0000 | R > 0 | $\overline{ZS}$ |
| 0001 | R ≧ 0 | $\overline{S}$ |
| 0010 | R ≦ 0 | Z + S |
| 0011 | R < 0 | S |
| 0100 | A ⌴>⌴ B | $Z\overline{C}$ |
| 0101 | A ⌴≧⌴ B | C |
| 0110 | A ⌴≦⌴ B | $Z + \overline{C}$ |
| 0111 | A ⌴<⌴ B | $\overline{C}$ |
| 1000 | R ≠ 0 | $\overline{Z}$ |
| 1001 | Unconditional | 1 |
| 1010 | R = 0 | Z |
| 1011 | Overflow | V |
| 1100 | A > B | $\overline{Z}\, \overline{S \oplus V}$ |
| 1101 | A ≧ B | $\overline{S \oplus V}$ |
| 1110 | A ≦ B | Z + (S⊕V) |
| 1111 | A < B | S⊕V |

Notes:
Table symbols are defined as follows

| Symbol | Definition |
|---|---|
| R | ALU result |
| A | ALU A (left) input operand |
| B | ALU B (right) input operand |
| ⌴ ⌴ <, >, etc. | unsigned relational operator |
| RSFx,y | RSF Field x bit y |

Table 2, which follows, provides example predicate definitions for testing conditions signals output from a floating-point PE which adheres to the ANSI/IEEE Standard 754-1985 definition for binary floating-point arithmetic. The PE outputs four condition signals as defined in the standard. These are

| | |
|---|---|
| G | greater than |
| L | less than |
| E | equal |
| U | unordered |

In Table 2, the state of the G, L, E, and U bits is shown in troth-table form. For example, predicate code 0011 binary, corresponding to the predicate condition A>=B, is true if G=1 AND L=0 AND E=1 AND U=0.

The foregoing predicate definitions are examples. Clearly, other predicates could be defined by one skilled in the art for applications other than fixed- or IEEE binary floating-point arithmetic, with widths other than four bits, and so on.

Table 2 provides examples of predicate definitions for floating point compare operations.

TABLE 2

Predicate Definition for Floating-point Operations

| Predicate Code | Predicate | Condition Signals Test | | | |
|---|---|---|---|---|---|
| | | G | L | E | U |
| 0000 | A = B | 0 | 0 | 1 | 0 |
| 0001 | reserved | | | | |
| 0010 | A > B | 1 | 0 | 0 | 0 |
| 0011 | A > = B | 1 | 0 | 1 | 0 |
| 0100 | A < B | 0 | 1 | 0 | 0 |
| 0101 | A < = B | 0 | 1 | 1 | 0 |
| 0110 | A ? B | 0 | 0 | 0 | 1 |
| 0111 | reserved | | | | |
| 1000 | A ? <> B | 1 | 1 | 0 | 1 |
| 1001 | unconditional | X | X | X | X |
| 1010 | A NOT (>) B | 0 | 1 | 1 | 1 |
| 1011 | A NOT (> =) B | 0 | 1 | 0 | 1 |
| 1100 | A NOT (<) B | 1 | 0 | 1 | 1 |
| 1101 | A NOT (< =) B | 1 | 0 | 0 | 1 |
| 1110 | A NOT (?) B | 1 | 1 | 1 | 0 |
| 1111 | reserved | | | | |

Notes:

| Symbol | Definition |
|---|---|
| ? | unordered |
| X | don't care |

Referring now to FIG. 3, the immediate predicate branch instruction format will be described. The immediate predicate branch instruction 500 includes five segments. There is an operation code 502, an operation extension 504, a predicate mode 506, a predicate field 508, and a displacement 510. Fields 502, 504, and 510 are well known instruction fields and are not of particular concern regarding the present invention. However, predicate mode field 506 may have as few as 1 bit for a 2 processing element system or many bits for a much larger system having a much larger number of processing elements. In the example shown, the PM field 506 has 2 bits. These bits may be used to control application of condition codes in relation to processing elements as follows:

| Binary Bits | |
|---|---|
| 00 | Apply predicate to conditions occurring in processing element 1 102 |
| 01 | Apply predicate to conditions occurring in processing element 2 104 |
| 10 | Apply predicate to conditions occurring in processing element 3 106 |
| 11 | Apply predicate to conditions occurring in processing element 4 108 |

Note that this instruction allows the predicate to be applied to a single processing element at a time. It does not allow branching on conditions generated by two or more processing elements simultaneously. An instruction with two or more predicate fields and associated logic mask fields could easily be implemented if the instruction could be extended or the displacement field be reduced in size.

Referring now to FIG. 4, the format of the registered predicate branch instruction will be described. Registered predicate branch instruction 600 includes four fields. An operation code field 602 and operation code extension 604 as above, a reserved field 606 and a displacement field 608. When registered predicates are used, no instruction bits are required to contain a predicate field so these bits can be reserved for other use such as being added to the displacement field 608.

Figure 5:
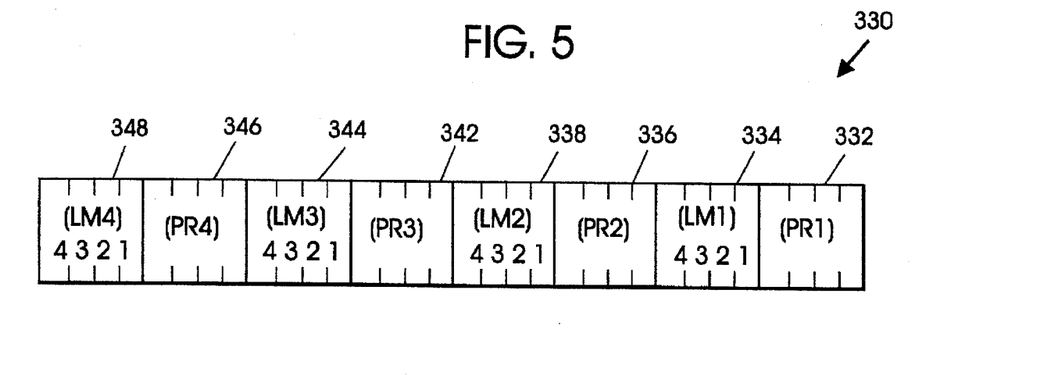
FIG. 5 is a diagram of a multiple predicate register format in accordance with the present invention.

In this instruction type, multiple predicates are assumed to be contained in a multiple predicate register (MPR) as shown in FIG. 5. The MPR 330 also contains an equal number of logic mask fields 334, 338, 344, and 348 associated with processing elements 1 102, 2 104, 3 106, and 4 108. These logic mask fields determine how the registered predicates in fields 332, 336, 342 and 346 for processing elements 102, 104, 106 and 108, respectively, are used to branch on multiple processing element condition codes. Multiple predicate register 330 includes a logic mask field and a predicate field for each processing element. Thus, for the preferred embodiment of the present invention as described herein, predicate field 332 and logic mask field 334 are associated with processing element 102, predicate field 336 and logic mask field 338 are associated with processing element 104, predicate field 342 and logic mask field 344 are associated with processing element 106 and predicate field 346 and logic mask field 348 are associated with processing element 108, respectively. The instructions described with respect to FIGS. 3 and 4 and the multiple predicate register described with respect to FIG. 5 in association with FIG. 4 contains information to perform multiple condition tests which are utilized to make a single BRANCH/NO BRANCH decision. As indicated above, multiple predicates, along with associated logic mask fields, can be stored in a separate register (MPR 330) separate from the instruction, or they may be included within the branch instruction (see FIG. 3).

Figure 6:
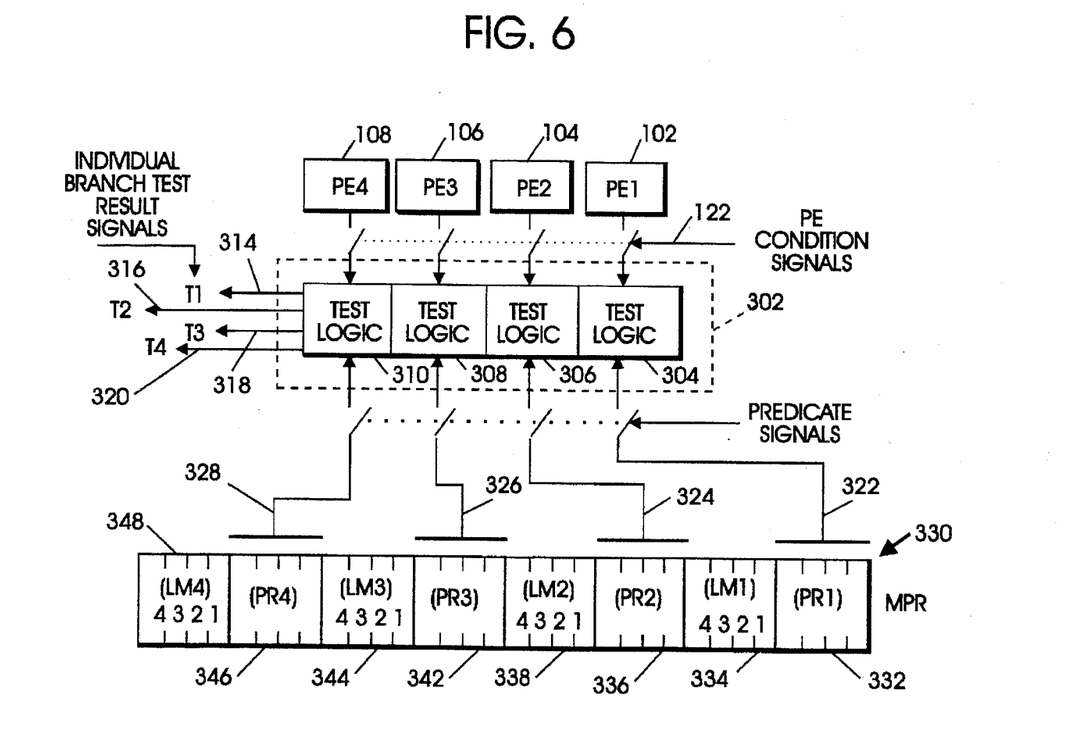
FIG. 6 is a block diagram of branch control logic in accordance with the present invention.

The following description assumes that the multiple predicates and logic mask fields are contained in a separate register (MPR 330), but the same technique would apply if the predicates in mask fields were contained in the branch instruction as shown in FIG. 3.

the MPR to generate an individual branch test result signal T1 314, T2 316, T3 318, and T4 320, each respectively associated with processing elements 102, 104, 106 and 108.

Figure 7:
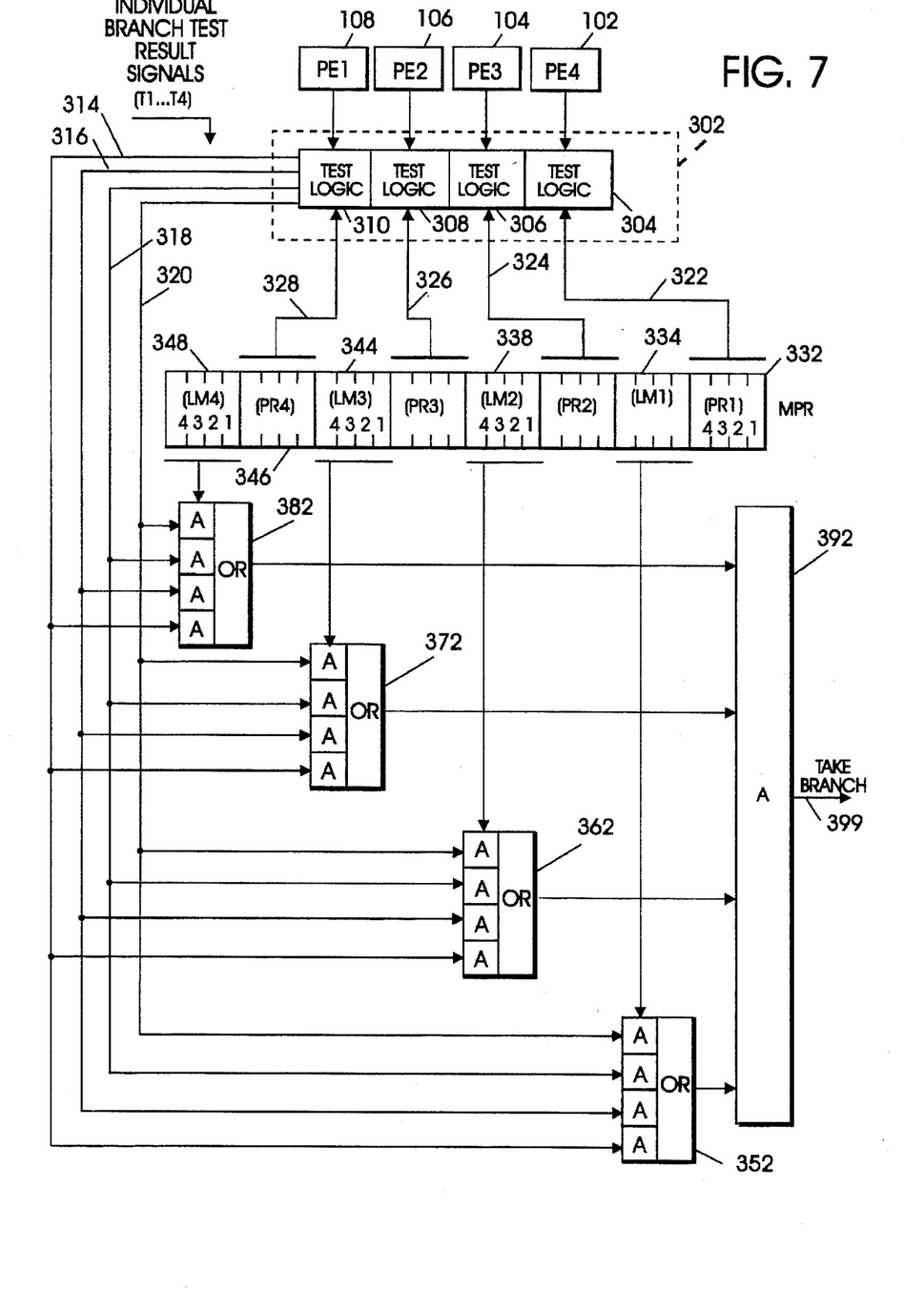
FIG. 7 is a block diagram showing multiple condition branch logic for four processing elements in accordance with the present invention.

Referring now to FIG. 7, the multiple condition branch logic will be described.

AND/OR circuits 352, 362, 372 and 382, respectively match the logic mask bit fields 334, 338, 344 and 348, respectively of MPR 330 with the individual branch test result signals 314, 316, 318 and 320, respectively wherein each AND/OR circuit produces an output signal of the form (T1 AND b1) OR (T2 AND b2) OR (T3 and b3) OR (T4 AND b4), where Tn is an individual test result signal and $b_n$ is a corresponding bit from one of the four logic mask fields 334, 338, 344 and 348. The outputs of AND/OR circuits 352, 362, 372 and 382 are ANDed in AND circuit 392 to produce a single TAKE BRANCH signal 399. AND/OR circuits 352, 362, 372 and 382 shown in FIG. 7 enable combined conditional branching based on the set of test result outputs on lines 314, 316, 318 and 320. The following examples are some of the specific combinations which may be selected using the logic shown in FIG. 7:

Branch if T1 OR T2 OR T3 OR T4;

Branch if T1 AND T2 AND T3 AND T4;

Branch if ((T1 OR T2) AND (T3 OR T4));

Branch if (T1 AND (T2 OR T3)); etc.

In all of the above cases, the desired test is specified by the setting of the logic mask fields 334, 338, 344 and 348 in MPR 330.

The logic mask field settings for the above examples plus several others are summarized in TABLE 3 below.

TABLE 3

| Bits in Individual Logic Mask Fields | | | | | | | | | | | | | | | | |
|---|---|---|---|---|---|---|---|---|---|---|---|---|---|---|---|---|
| ←LM4→ | | | | ←LM3→ | | | | ←LM2→ | | | | ←LM1→ | | | | Resulting Branch Function |
| b4 | b3 | b2 | b1 | b4 | b3 | b2 | b1 | b4 | b3 | b2 | b1 | b4 | b3 | b2 | b1 | (Branch if Function True) |
| 0 | 0 | 0 | 1 | 0 | 0 | 0 | 1 | 0 | 0 | 0 | 1 | 0 | 0 | 0 | 1 | T1 |
| 0 | 0 | 1 | 0 | 0 | 0 | 1 | 0 | 0 | 0 | 1 | 0 | 0 | 0 | 1 | 1 | T2 |
| 0 | 0 | 1 | 1 | 0 | 0 | 1 | 1 | 0 | 0 | 1 | 1 | 0 | 0 | 1 | 1 | T1 OR T2 |
| 0 | 0 | 0 | 1 | 0 | 0 | 0 | 1 | 0 | 0 | 0 | 1 | 0 | 0 | 1 | 0 | T1 AND T2 |
| 0 | 0 | 0 | 1 | 0 | 0 | 0 | 1 | 0 | 0 | 0 | 1 | 0 | 1 | 1 | 0 | T1 AND (T2 OR T3) |
| 0 | 0 | 1 | 1 | 0 | 0 | 1 | 1 | 1 | 1 | 0 | 0 | 1 | 1 | 0 | 0 | (T1 OR T2) AND (T3 OR T4) |
| 1 | 1 | 1 | 1 | 1 | 1 | 1 | 1 | 1 | 1 | 1 | 1 | 1 | 1 | 1 | 1 | T1 OR T2 OR T3 OR T4 |
| 1 | 0 | 0 | 0 | 0 | 1 | 0 | 0 | 0 | 0 | 1 | 0 | 0 | 0 | 0 | 1 | T4 AND T3 AND T2 AND T1 |
| 0 | 1 | 0 | 1 | 0 | 1 | 0 | 1 | 0 | 1 | 0 | 1 | 0 | 1 | 1 | 0 | T3 OR (T1 AND T2) |

Referring now to FIG. 6, the branch test logic will be described. Processing elements 102, 104, 106 and 108 produce a set of condition signals generally shown as 122 as first inputs to a test logic device 302 which includes individual test logic elements 304 associated with processing element 102, 306 associated with processing element 104, 308 associated with processing element 106 and 310 associated with processing element 108. A second set of inputs to test logic 302 are predicate signals from the MPR 330 where predicate 1 field 332 produces a set of predicate signals 322 to test logic 304, predicate 2 field 336 produces predicate signals on lines 324 to test logic 306, predicate 3 field 342 produces predicate signals on lines 326 to test logic 308 and predicate 4 field 346 produces predicate signals on lines 328 to test logic 310. Test logic elements 304, 306, 308 and 310 each perform a compare of the condition signals from the processing elements with the predicate signals from

ILLUSTRATIVE EXAMPLE

To illustrate the utility of multiple predicate branching, the task of searching a linked list may be used as an example. A linked list consists of nodes in processor memory linked together by address pointers. In such case, it is assumed that each node in the list contains three values:

List node field 0: Data 0;

List node field 1: Data 1; and

List node field 2: Pointer to next list node.

The last node in the list will contain a null pointer equal to zero in its list node field 2. Assume that it is desired to search the list for a node containing a particular Data 0 value and a particular Data 1 value and return the pointer to the list node containing the matching values. If no match is found in any of the nodes in the list, the null pointer is returned. Further assume a hardware implementation with three fixed point processing elements, numbered 1, 2 and 3, each capable of performing an operation in parallel with the others. A compare instruction executed on processing element 1 102 will result in condition signals which may be tested by a branch predicate PR1 (see FIG. 5). PR1 is applied to the condition signals to produce test signal T1. Processing elements 104 and 106 produce similar condition signals which may be tested by predicates PR2 and PR3, producing signals T2 and T3 respectively. Further, assume the existence of three load ports in processor memory allowing all three linked list node fields to be loaded into the general purpose registers in a single cycle. With the above assumptions, the following program code will search the list for the matching values of ten and twenty:

| | |
|---|---|
| i0: LOAD | R3, list_head |
| i1: LOAD | R8, R3 |
| i2: LOAD | R1,mem(R8); LOAD R2,mem(R8 + 1); LOAD R3,mem(R8 + 2) |
| i3: CMP | R1,10; CMP R2,20; CMP R3,0 |
| i4: BRANCH to i1: | if (PR1: R ≠ 0 OR PR2: R ≠ 0) AND PR3: R ≠ 0 |

In the above program code fragment, instruction i0 initializes general purpose register R3 to point to the first node of the list, list_head. Instruction i1, the first instruction of the search loop, loads the contents of register R3 into register R8. Instruction i2 loads list node field 0 of the node pointed to by R8 into R1; loads list node field 1 of the node pointed to by R8+1 into R2; and loads list node field 2 of the node pointed to by R8+2, a pointer to the next node, into R3. Instruction i3 compares the contents of R1 with 10 and sets PE1 condition signals as a result; compares the contents of R2 with 20 and sets PE2 condition signals as a result; and compares the contents of R3 with 0 and sets PE3 condition signals as a result. Instruction i4 is a multiple predicate branch that applies the predicate R≠0 (result not equal 0, i.e., operands of the compare were not equal) to PE1 condition signals producing test signal T1; applies the predicate R≠0 to PE2 condition signals producing test signal T2; applies the predicate R≠0 to PE3 condition signals producing test signal T3; and will branch to i1 (continue searching the list) if (PRI:R≠0 OR PR2: R≠0) AND PR3: R≠0, that is, both values do not match and the end of the list (null pointer of 0) has not been encountered. The loop terminates when the branch falls through to i5 and subsequent instructions which return either the pointer to the node with the matching data values or the null pointer if no match was found.

The above example shows the parallel execution of the three compare operations of instruction i3. The results of these compares are available for testing by a single multiple predicate branch instruction. If the example were to be executed on a system having an architecture with a single condition code or condition register field, it would have to be recoded into a serial thread of compare and branch instructions, which would significantly increase the execution time of the loop. If it were to be executed on one of the VLIW systems described in the Background section above, i4 would contain multiple branch instructions and additional logic operator instructions would have to be inserted in the loop to accomplish the same complex branch condition which is achieved by the present invention with a single branch instruction performing compares in parallel.

Although the present invention and its advantages have been described in detail, it should be understood that various changes, substitutions and alterations can be made herein without departing from the spirit and scope of the invention as defined by the appended claims.

What is claimed is:

1. A data processing system having at least two processing elements, comprising:
   means for controlling asynchronous parallel operation of said plurality of processing elements;
   a shared memory system, coupled to said plurality of processing elements, for storing instructions and data required for operation of each of said processing elements;
   one or more registers, each register having one or more fields, denominated as a predicate field, each of said predicate fields being associated with one of said processing elements;
   means for comparing a plurality of branch condition signals from a plurality of said processing elements with said predicate fields to generate a plurality of individual branch test signals; and
   logic means for applying a logic mask associated with each of said processing elements to said individual branch test signals to produce a branch decision signal which is acted upon based on a single instruction.

2. A data processing system, according to claim 1, wherein said means for storing the predicate field further comprises:
   means for storing a logic mask field associated with each of said processing elements, wherein said logic mask field is applied to said means for comparing to enable complex combinations of branch condition signals to be combined to produce a single branch decision signal.

3. A data processing system, according to claim 1, further comprising:
   separate means for storing a logic mask field associated with at least one of said processing elements, wherein said logic mask field is applied to said means for comparing to enable complex combinations of branch condition signals to be combined to produce a single branch decision signal.

4. A method, for providing in a single instruction execution, a branch instruction which operates on multiple condition codes, in a data processing system having a plurality of asynchronously operating processing elements, comprising the steps of:
   storing, in one or more registers, a plurality of predicate fields, each said predicate field being associated with one of said processing elements;
   comparing a plurality of branch condition signals from a plurality of said processing elements with said predicate fields to produce individual branch test signals; and
   gating said individual branch test signals against a plurality of logic mask signals to produce a branch decision signal which is acted upon based on a single instruction.

5. A method, according to claim 4, further comprising the steps of:
   storing a plurality of logic mask fields, each of said logic mask fields associated with each said processing elements on a one to one basis; and
   applying at least one of said logic mask fields to said means for comparing to enable complex combinations of branch condition signals to be combined to produce a single branch decision signal responsive to a single instruction.

6. A method of controlling a conditional branch instruction for a branch in program execution on the occurrence of one or more predetermined branch condition signals from one or more processing elements of a plurality of processing elements in a data processing system, comprising the steps of:

provide a first field containing an operation code for an instruction to be executed;

providing a second field containing values indicative of one processing element of said plurality of processing elements and associating a mode of operation with a predicate contained in a predicate field of said instruction;

providing one or more registers, each such register having one or more predicate fields, each predicate field containing predicate data associated with one of said processing elements;

comparing a plurality of branch condition signals asynchronously generated by said processing elements with said predicate data to generate individual branch test signals, each associated with one of said processing elements; and applying a predetermined logic mask to said individual branch test signals to generate a branch decision signal which is acted upon based on a single instruction.

7. A conditional branch instruction method, according to claim 6, further comprising:

providing an operation code extension field.

8. A method of controlling a conditional branch instruction for on the occurrence of one or more predetermined branch condition signals generated asynchronously from one or more processing elements of a plurality of processing elements in a data processing system, comprising:

providing a first field containing an operation code for an instruction to be executed if the branch is to be executed;

providing a displacement field containing address information associated with said instruction;

providing a plurality of multiple predicate registers on a one to one basis with said plurality of processing elements, for storing a plurality of predicates, each predicate in said register being associated with one of said processing elements;

comparing a plurality of branch condition signals asynchronously generated by said processing elements with said predicate data to generate individual branch test signals, each associated with one of said processing elements; and applying a predetermined logic mask to said individual branch test signals to generate a branch decision signal which is acted upon based on a single instruction.

9. A method of a executing a conditional branch instruction, according to claim 8, further comprising:

providing an operation code extension field containing an extension to the operation code contained in said first field.

10. A method of a executing a conditional branch instruction, according to claim 8, further comprising:

providing a logic mask field associated with each said processing element on a one to one basis.

* * * * *